(12) United States Patent
Charette et al.

(10) Patent No.: US 9,544,222 B2
(45) Date of Patent: Jan. 10, 2017

(54) ROUTER

(71) Applicants: Keith Charette, Westport, CT (US); Valeriu Goldberger, Waltham, MA (US); Al Ivanov, Orange, CT (US)

(72) Inventors: Keith Charette, Westport, CT (US); Valeriu Goldberger, Waltham, MA (US); Al Ivanov, Orange, CT (US)

(73) Assignee: VENTUS NETWORKS, LLC, Norwalk, CT (US)

( * ) Notice: Subject to any disclaimer, the term of this patent is extended or adjusted under 35 U.S.C. 154(b) by 381 days.

(21) Appl. No.: 13/737,051

(22) Filed: Jan. 9, 2013

(65) Prior Publication Data

US 2014/0192710 A1 Jul. 10, 2014

(51) Int. Cl.
| | | |
|---|---|---|
| H04L 12/707 | (2013.01) | |
| H04W 40/02 | (2009.01) | |
| H04L 12/721 | (2013.01) | |
| H04L 29/06 | (2006.01) | |
| H04W 12/02 | (2009.01) | |

(52) U.S. Cl.
CPC .............. H04L 45/22 (2013.01); H04W 40/02 (2013.01); *H04L 45/24* (2013.01); *H04L 45/70* (2013.01); *H04L 63/0272* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 5,577,196 A * | 11/1996 | Peer | 714/4.1 |
| 6,275,470 B1 * | 8/2001 | Ricciulli | F25B 41/003 370/238 |
| 7,190,974 B2 | 3/2007 | Efland et al. | |
| 7,646,343 B2 | 1/2010 | Shtrom et al. | |
| 7,948,986 B1 * | 5/2011 | Ghosh et al. | 370/392 |
| 8,090,790 B2 * | 1/2012 | Bestler | 709/212 |
| 8,094,575 B1 * | 1/2012 | Vadlakonda et al. | 370/252 |
| 2002/0103943 A1 * | 8/2002 | Lo et al. | 710/2 |
| 2004/0093426 A1 * | 5/2004 | Sahasrabudhe | H04L 29/06 709/238 |
| 2006/0098659 A1 * | 5/2006 | Chinner | 370/394 |
| 2008/0008165 A1 * | 1/2008 | Ikeda et al. | 370/360 |
| 2008/0101227 A1 * | 5/2008 | Fujita et al. | 370/232 |
| 2008/0112410 A1 * | 5/2008 | Wood | 370/392 |
| 2010/0262882 A1 * | 10/2010 | Krishnamurthy | 714/748 |
| 2011/0273988 A1 * | 11/2011 | Tourrilhes | H04L 41/0816 370/237 |
| 2013/0272318 A1 * | 10/2013 | Swinkels | H04L 41/0896 370/468 |
| 2014/0177446 A1 * | 6/2014 | Sun et al. | 370/236 |

* cited by examiner

*Primary Examiner* — Wei Zhao
*Assistant Examiner* — Ronald H Davis
(74) *Attorney, Agent, or Firm* — Grogan, Tuccillo & Vanderleeden, LLP (57) ABSTRACT

A router includes a first communications port, a second communications port, and a processor that is configured to transmit data via at least one of the first communications port or the second communications port.

23 Claims, 9 Drawing Sheets

ROUTER

BACKGROUND

Technical Field

The present invention relates to network devices and, more particularly, to network access points or routers.

Discussion of Art

Computers and similar devices can be connected to share and exchange information via computer networks. A common type of computer network is a local area network ("LAN") which will typically employ a data communication protocol (LAN standard), such as Ethernet, FDDI or token ring, that defines the functions performed by communications channel and physical layers of a communications architecture (i.e., a protocol stack). Several LANs may be interconnected by point-to-point links, microwave transceivers, satellite hook-ups, etc. to form a wide area network ("WAN") or "internet" that may span an entire country or continent.

Within a LAN, a switch or router is a computer that includes a plurality of ports that couple the switch to the other computers within the LAN. The switch transfers data among the other computers of the LAN. Transferring data includes includes receiving data at a source port from one computer and transferring that data to at least one destination port for receipt by another computer. For example, U.S. Pat. Nos. 5,737,526, 7,068,624, and 7,787,360, each incorporated herein by reference, discuss various aspects of routers and networks As mentioned, LANs are connected together via WANs, of which the Internet is the largest and best known example. The Internet is a global system of interconnected computer networks that use the standard Internet protocol suite (often called TCP/IP, although not all applications use TCP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support e-mail LANs connect to the Internet via "gateways." A gateway is a router computer that is connected between a LAN switch computer and a gateway or switch of a different LAN. Gateways switch data between LANs and separate intra-LAN traffic from Internet traffic. Thus, the Internet consists of communications links between gateways. In some cases, a local device may act both as a computer terminal (for user interface) and as a router and/or gateway A router may be connected in communication with the individual computers or devices either by wires (e.g., Ethernet) or wirelessly (e.g., WiFi or similar proprietary radio communication; infrared communication; ultrasound). Similarly, a gateway may be connected with the Internet either by wire/cable (e.g., telephone; DSL; coaxial or optical fiber) or wirelessly (e.g., cellular broadband)

By comparison to wired Internet gateways, gateways using cellular broadband connections offer reduced installation cost, flexibility of location, and ease of maintenance. However, cellular connections are known to "drop" from time to time.

BRIEF DESCRIPTION

In certain embodiments of the invention, a multiple channel network access point is formed by concurrent operation of two or more communications ports (which may include cellular modules or transceivers or fixed line interface ports) that are jointly controlled by a common processor. The common processor establishes a plurality of communications channels, each corresponding to one or more of the communications modules. Thus, a communications channel is implemented in software while a communications port is an item of hardware. During periods where a connection already established by a first communications port is adversely affected by any one of a number of factors, a second communications port is operable to provide hot standby redundancy. Thus, each communications port provides a distinct channel of communication. The redundant communications port(s) or channel(s) may be connected through different cellular or fixed line networks, thus providing a provider agnostic failover solution.

In other embodiments of the invention, the multiple channel network access point includes two or more communications ports (cellular modules/transceivers and/or fixed line interface ports) that operate on different networks or channels. The multiple ports are jointly controlled to provide "channel bonding," a mode of operation in which a single data stream is transmitted simultaneously across both networks or channels. In certain aspects, channel bonding provides for a real-time multiple carrier communications protocol. In selected aspects, the single data stream is split across the channel bond such that both channels must be received in order to acquire any packet of the data stream.

In other embodiments, a multichannel network access point or router provides local wireless connectivity to a multi-carrier broadband WAN. The local wireless connectivity may be 802.11 compliant, or may be a proprietary communication protocol. ("802.11" is an IEEE standard for implementing wireless local area network (WLAN) computer communication in the 2.4, 3.6 and 5 GHz frequency bands. The 802.11 family consists of a series of half-duplex over-the-air modulation techniques that use the same basic protocol.

In aspects of the invention, one or more of a plurality of secure connection servers receives a data stream from a network access point via one or more of a plurality of communications channels. The plurality of secure connection servers collaborate to forward the data stream to a host system. In the event that one of the plurality of communications channels drops connection, one or more of the plurality of secure connection servers continues to receive the data stream via one or more of the other communications channel(s)

In embodiments, the router includes a tilt or motion sensor (e.g., an accelerometer) for detecting and alerting physical tampering, unauthorized equipment or property relocation, seismic activity or other sources of physical disturbance. The router may also include other onboard security features, such as a front panel alarm (to indicate access to the internal components via opening the front panel) and an internal thermometer (to detect possible problems with the electronic components)

In embodiments, the router includes a built in battery for uninterruptible operation under various conditions and for capability to communicate with network equipment even in the event of unauthorized movement or theft. For example, embodiments may include embedded GPS tracking devices In other embodiments, the router includes an integrated data storage device for use as data/video recording device or as multimedia server. The data storage device may, for example, be a hard drive (HDD) or a solid state drive (SSD), a flash memory card, an SDHC, etc In other embodiments, the router includes a touch screen interface with integrated control and diagnostic capability In aspects of the invention, a network access point receives a status signal from a local device, sends the status signal via an intermediate host to a host system, and returns an acknowledgment to the local device. Concurrently, the intermediate host buffers the status signal, receives a query from a host device, and returns the status signal to the host device. The network access point and the intermediate host thereby provide an apparent low latency connection from the host device to the local device These and other objects, features and advantages of the present invention will become apparent in light of the detailed description of the best mode embodiment thereof, as illustrated in the accompanying drawings.

DRAWINGS

FIG. 5 (comprising views 5A and 5B) shows in flowchart view an algorithm for calculating cost of communication via a given channel

DETAILED DESCRIPTION OF THE DRAWINGS

Figure 1:
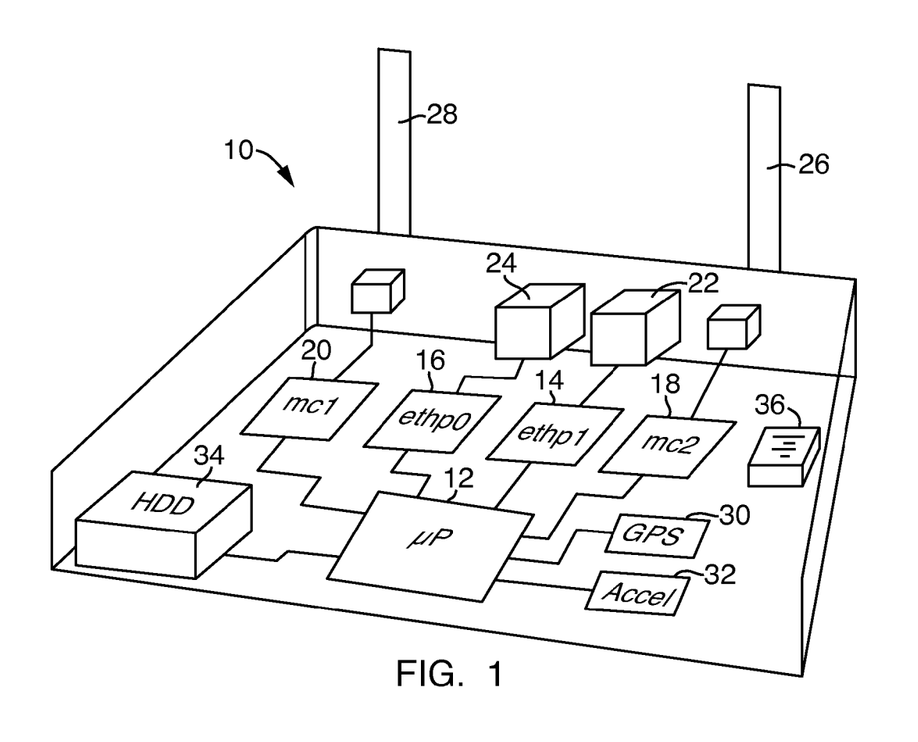
FIG. 1 shows in schematic perspective view a multiple channel network access point or router, according to an embodiment of the present invention

Referring to FIG. 1, a multiple channel gateway or router 10 includes at least one processor 12, a first communications port 14, and second communications ports 16, 18, 20. The physically separate communications ports 14, 16, 18, 20 are connected for electrical communication with the processor 12. At least two of the communications ports 14, 16, 18, 20 are cellular transceivers that are configured for cellular broadband communication, as further discussed below. Others of the communications ports 14, 16, 18, 20 may be Ethernet ports. Each of the communications ports 14, 16, 18, 20 is connected with an interface 22, 24, 26, or 28, which may be a wired (Ethernet) interface 22, 24 or a cellular (antenna) interface 26, 28. In certain embodiments, one of the wired interfaces 22, 24 may be a dedicated VOIP interface for connection of a standard telephone console.

The router 10 also includes an embedded GPS module 30 and an onboard accelerometer 32 for tracking movement and position of the router. In certain embodiments, the processor 12 is configured to sporadically check the GPS 30 and/or the accelerometer 32 for detecting movement of the access point 10. On detection of abnormal movement via the GPS 30 and/or the accelerometer 32, the processor 12 is configured to implement a battery conserving mode of operation, in which communications are discontinued except for periodic or sporadic reports of location via one of the cellular communications modules. The location may be determined directly by GPS, or indirectly by accelerometer integration (inertial positioning). These features enable theft detection and tracking Additionally, the multiple channel access point 10 includes a data storage device 34 and a power supply (battery) 36. The data storage device 34 may be any of, for example, a hard drive (HDD) or a solid state drive (SSD), a flash memory card, an SDHC, etc. The backup power supply 36 may be a battery, an ultracapacitor, or any other high-energy-density device suitable for storing and supplying DC electrical energy. The backup power supply 36 can be useful in a variety of modes of operation, including a low power tracking mode activated by the tilt sensor 32 or a continuity mode activated by loss of normal electrical power without motion of the access point 10.

The multiple channel access point 10 is highly configurable with custom options in response to specific situations (e.g., carriers, region, customer choices, data plan, hardware, etc.). Using the data storage device 34, the access point 10 is configured to log and report all events describing its behavior (e.g., software event messages, availability status, connection properties, etc.)

Figure 2:
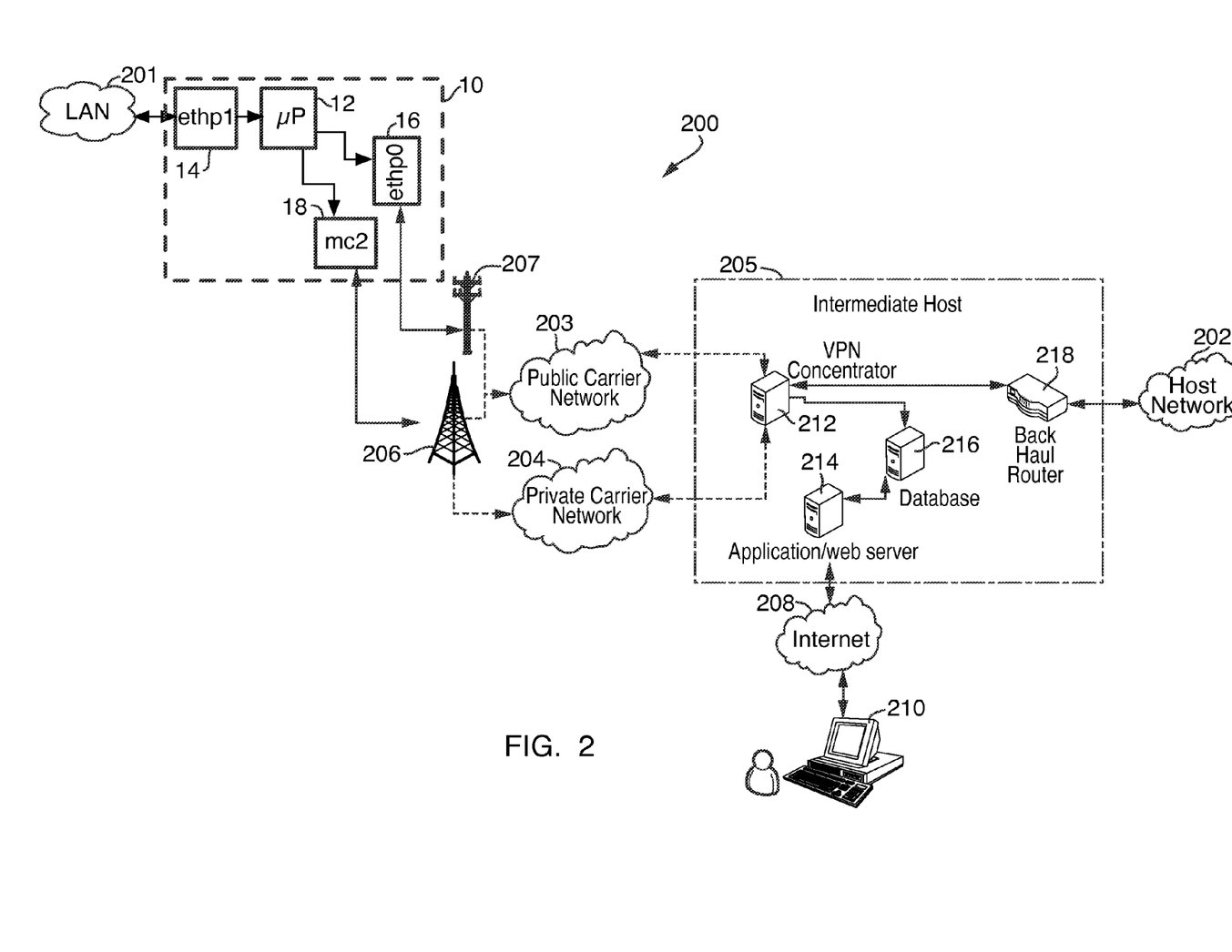
FIG. 2 shows in schematic view a network system including the router shown in FIG. 1

FIG. 2 shows a network system 200 in which data is passed between a local area network (LAN) 201 and a host network 202 via the processor 12 and one or more of the communications ports 14, 16 within the router 10. At least one of the communications ports 14, 16, 18, 20 is configured for communication with the LAN 201, while others of the communications ports are configured for communication with the host network 202. The processor 12 is configured to intermediate communications between the LAN 201 and the host network 202, including conversion of communications protocols between, e.g., LAN (Ethernet) frames and IP packets. (In some embodiments, protocol conversion is accomplished by dedicated integrated circuits, separate from the processor.) Between the router 10 and the host network 202, the data passes through public and/or private networks 203, 204 and through an intermediate host 205, e.g., a network operations center ("NOC") or one or more cloud servers.

One or more of the public or private networks 203, 204 may be a cellular broadband network 206 that is accessed via a cell tower; alternatively, one or more of the public or private networks may a wired network 207 (e.g., optical fiber, coaxial cable, or POTS). The intermediate host 205 monitors transmission of data and provides system data (e.g., number of packets sent/received, latency, signal strength, transmission protocol, router board temperature, etc.) via the Internet 208 in response to authorized inquiries from one or more external user terminal(s) 210. The intermediate host 205 includes or provides the functionality one or more network servers 212, an application/web server 214, a database server 216, and a back haul router 218. These components of the intermediate host 205 may be physically collocated as in a NOC, or may be geographically diverse as in a cloud server configuration.

The network server(s) 212 handle communications between the router 10 and the intermediate host 205. One or more of the network servers 212 may be configured to establish a secured connection, e.g., a VPN or SSL connection or other encrypted protocol. In the drawings, solely for convenience, secured connections are marked as "VPN;" however, this is only one example among many possible encrypted protocols. In certain embodiments, the router 10 is configured to communicate with a primary or default one of the network servers 212, and to shift over to a secondary or alternate network server, in case the primary network server ceases to deliver satisfactory service. Where multiple routers 10 are provided for communication of multiple LANs 201 with a common host system 202, approximately half of the routers 10 can be configured to use a first network server as their primary concentrator and to use a second network server as their auxiliary concentrator, while the other half of the routers 10 can be configured to use the second network server as their primary concentrator and to use the first network server as their auxiliary concentrator.

The application server 214 interfaces the external user terminal(s) 210 with the network servers 212 and with the database 216. Via the application server 214 and the network servers 212, a user at one of the external user terminals 210 can issue commands to, and check status of, any of the routers 10 that is authorized for that user within the database 216.

Both the network server(s) 212 and the application server 214 interact with the database server 216, which maintains a history of system performance including the status history of each router 10. As mentioned above, the database 216 also includes authorization settings that correlate each external user to a listing of routers 10 accessible by that user.

The back haul router(s) 218 handle communications between the intermediate host 205 and the host system 202. As further discussed below, the back haul routers 218 can be configured to intermediate or to intercept selected communications intended to pass between the user device 201 and the host system 202.

The router 10 and the intermediate host 205 work together within the network system 200 to establish an artificially low latency (signal transit and response time) between the LAN 201 and the host network 202. The artificial low latency is accomplished by buffering and retransmitting status check signals in both directions. At the router 10, routine status signals from the LAN 201 to the host system 202 ("keep alive" signals) are buffered and only periodically retransmitted to the host system 202 via the intermediate host 205. In other words, the processor 12 intermediates the data flow of keep alive signals from the LAN 201, through the communications ports 16, 18, to the host system 202. Instead of transmitting all of the data flow, the processor 12 intercepts selected data so as to reduce communication between the communications ports 16, 18 and the host system 202. For example, user devices attached to the LAN 201 may transmit keep alive signals to the router 10 at a first periodicity. However, the router 10 may intercept the keep alive signals from the user devices, and re-transmit to the intermediate host 205 a single keep alive signal at a decreased second periodicity, longer than the first periodicity, whereby communication with the host system 202 and bandwidth usage are reduced.

The user devices attached to the LAN 201 may expect to receive host system acknowledgments ("acks") of their keep alive signals. To this purpose, the router 10 buffers each ack received from the host system 202 via the intermediate host 205, and re-transmits these acks to the LAN 201 at an increased periodicity matching that of the user device keep alive signals. For example, in case the router 10 has only been re-transmitting keep alive signals to the host system 202 at the second longer periodicity (thus receiving acks at the same periodicity), then in response to each keep alive signal from a user device, the router 10 will re-transmit on the LAN 201, at the first shorter periodicity, a copy of the most recently received ack. In certain embodiments, the router 10 is configured to modify the buffered ack, to match the content of the most recently received keep alive signal. For example, in case the user devices and the host system are configured to use time-stamped acks and keep alive signals incorporating device identifiers (e.g., MAC addresses), then the router 10 can be configured to modify the time stamp and MAC address components of the buffered ack according to the time stamp and MAC address of the most recently received keep alive signal.

At the intermediate host 205, status inquiries from the host system 202 are passed through to the router 10, for eventual receipt by the LAN 201. However, the intermediate host 205 immediately responds to each status inquiry, based on the keep alive signal most recently retransmitted from the router 10. Thus, the intermediate host 205 can provide to the host system 202 an apparent latency less than 30 μs, although the actual round-trip time from host system to LAN 201 and back may exceed 50 μs. Again, in case the host system is configured to use time-stamped status inquiries, then the intermediate host 205 can be configured to modify the time stamp of the most recently retransmitted keep alive signal, so as to match the most recently received status inquiry.

Above, the router 10 was described as re-transmitting keep alive signals at a second periodicity. In many cellular networks, the network towers are configured to send a shutdown signal to any transceiver that has not transmitted data within a previous period of time. Accordingly, in certain embodiments the second periodicity can be selected to cause re-transmission of keep alive signals at intervals less than the network tower time-out period, whereby the network tower is prevented from sending a shutdown signal to the router's cellular transceiver.

Still referring to FIG. 2, the router 10 works with the intermediate host 205 to maintain a fault tolerant and redundant system that recovers from any connection that is not working by changing the connection parameters, resetting the connection, changing the endpoints, and/or rebooting the router. For example, the router 10 may auto-configure to select among multiple network servers provided at the intermediate host 205, based on a cost of connecting to each of the multiple servers. Additionally, the router 10 may auto-configure to select among communications channels for reaching the selected server, again based on a cost of connecting via each of the available channels. For example, the router 10 may select among two different cellular channels (with different carriers) and one or more wireline channels. The router 10 may also select among multiple network server(s) 212 and/or may select among public and private networks on the same channel. In certain embodiments, the router 10 may be configured to switch from public network 203 to private network 204, or vice versa, in response to an excessive high quantity of traffic on the currently active network.

Figure 3:
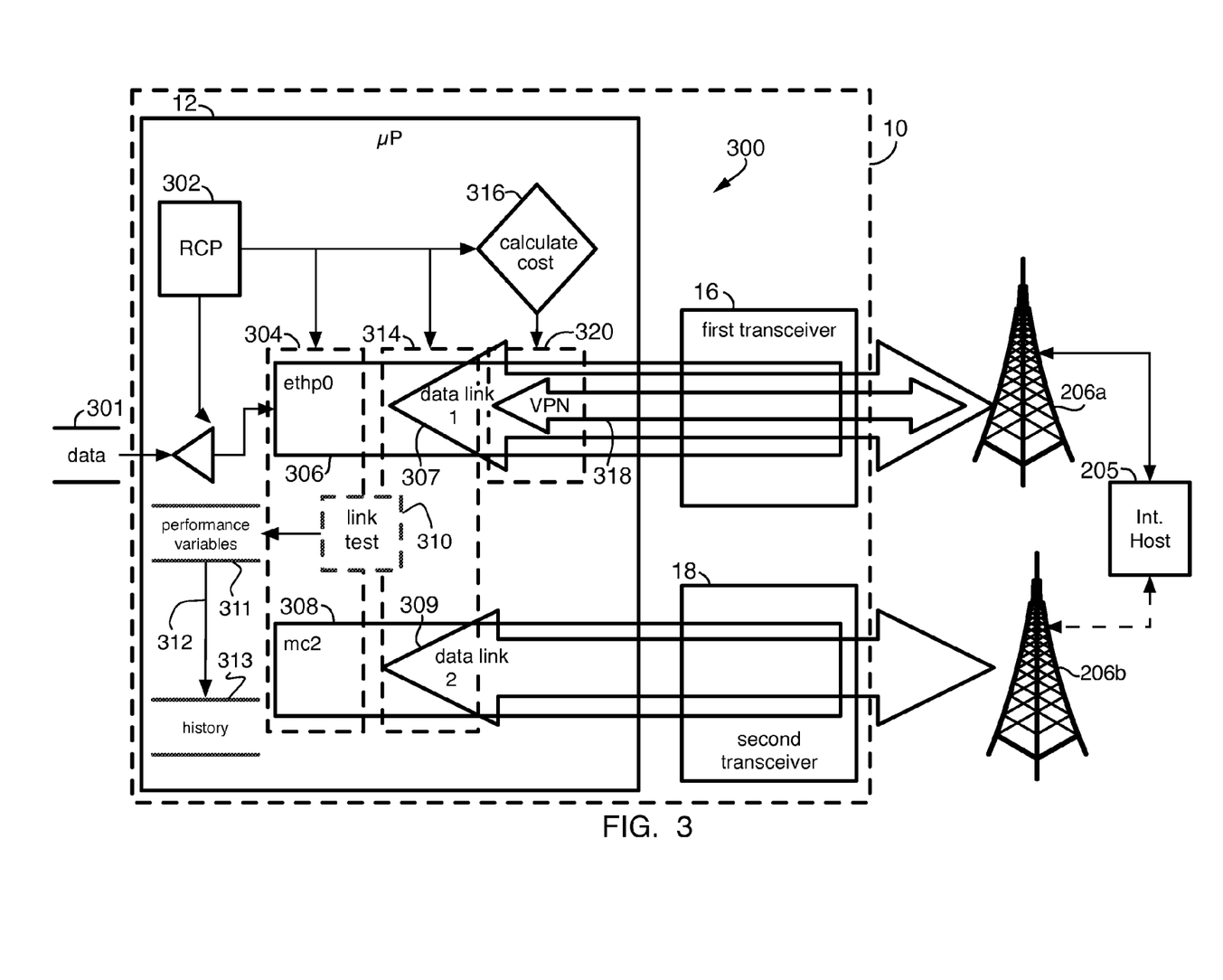
FIG. 3 shows in schematic view a first mode of operation of the router shown in FIG. 1
Figure 4:
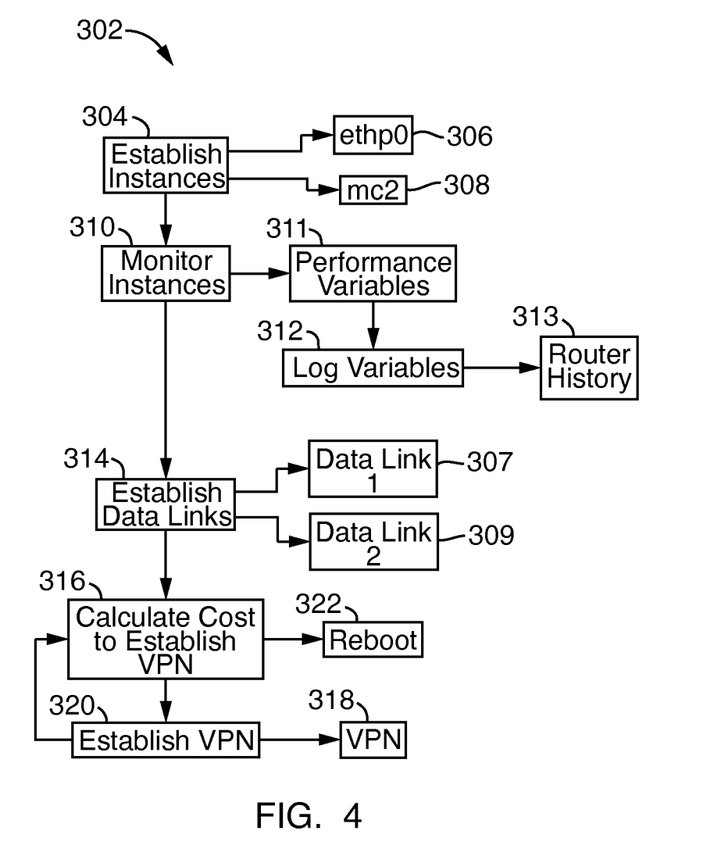
FIG. 4 shows in flowchart view the first mode of operation of the router shown in FIG. 1

FIGS. 3 and 4 illustrate how the processor 12 implements a master communications protocol router control protocol (RCP) 302 for auto-configuring the router 10 to transmit a single (simplex) data stream 301 via one of several router channels ethp0, mc2, etc. that correspond to particular data connections. The router control protocol 302 serves several purposes: it starts/stops all router channels ethp0, mc2, etc.; it chooses an active channel for routing data 301, on a cost basis as further discussed below; it monitors all router channels for software problems, and restarts each channel or an associated communications port as necessary; and it decides when to reboot the router 10 (if all router channels request it).

Solely by way of example, FIG. 3 illustrates a first communications port 16 (Ethernet port) that is connected to a fixed line using Ethernet protocol and a second communications port 18 (cellular transceiver) that is connected with a wireless broadband network using CDMA or the like protocol. However, the invention equally is applicable to operation of multiple parallel wireless transceivers for cost-allocated data transmission, such that the first communications port 16 could be implemented in a cellular transceiver.

At step 304 the router control protocol 302 establishes a plurality of router channels or channels 306, 308, etc. (respectively labeled "ethp0," "mc2") that correspond to each of the available communications ports 16, 18, etc. The router channel 306 (ethp0) is established via the first communications port 16, which is connected to a first, wired Ethernet connection; while the router channel 308 (mc2) is established via the second communications port 18, which is connected to a second, cellular broadband connection. As may be suggested by the transmission pole and cellular tower shown at right, the invention is not limited to choosing only between a single wired connection or a single cellular connection, but equally can switch data among plural wired or plural cellular connections, according to the general principles further discussed below. Additionally, the invention is not limited to software switching of data (within the processor 12) but also can include physical switching of data (by components external to, and controlled by, the processor 12).

The channels 306, 308 are implemented in the processor 12 for directing data traffic to their corresponding communications ports. Router control protocol 302 switches traffic among the channels. As part of initiating the various channels, the router control protocol 302 checks whether corresponding components (communications ports 14, 16) are operational. Router control protocol 302 also establishes a power management protocol for the communications ports and other board components. Further, at step 310 the router control protocol 302 continuously or sporadically monitors performance of the router channels 306, 308 by conducting "link tests." Monitored performance variables 311 include, e.g., debug codes, status reports, event messages, connection availability, latency, signal strength, network protocol, wireless module temperature, etc. Link tests are accomplished by sending and receiving status reports and commands between the router 10 and the intermediate host 205. Link tests establish values for connection status and latency, which in turn are used for calculating a cost of building an encrypted connection (e.g., a encrypted connection, an SSL connection, etc.), as further discussed below.

At step 312, the router control protocol logs the monitored performance variables 311 into a router history 313 that is stored both in the router 10 and in a database of the intermediate host 205.

At step 314, the router control protocol 302 instructs the channels 306, 308 to establish data links (communications channels) 307, 309 via the respective communications ports. The data links 307, 309 are established from the processor 12 to the network operations center (intermediate host) 205 via the primary and secondary channels 306, 308 and the corresponding communications ports 16, 18.

At step 316, the router control protocol 302 implements an algorithm 400 (further discussed below with reference to FIGS. 5A-5B) to calculate a cost of building/maintaining an encrypted connection 318 (labeled "VPN" for brevity, although other encrypted protocols are known) via each of the different channels 306, 308. Step 316 is repeated sporadically so that router control protocol 302 continually re-calculates the cost of maintaining the encrypted connection 318, according to the algorithm 400 as discussed with reference to FIG. 5. "Cost" in this context implies a combined measure of difficulty and quality, i.e., how much time does it take to establish an encrypted connection or "tunnel"; how long will that tunnel stay open; and how much data throughput can be achieved during the time that the tunnel is open. Lower costs indicate better values for each of these factors, with a zero cost corresponding to effectively instantaneous connection at the highest achievable data rate and reliability. "Sporadically" in this context means multiple times, either with or without a set periodicity. For example, sporadic recalculation of costs could be accomplished according to a fixed time, according to a sequence of increasing time intervals, according to any other schedule, or at random times. "Continually" implies that recalculation is repeated for as long as router control protocol 302 is running.

Constructing a cost for each router channel (and thereby choosing an active channel for establishing the encrypted connection 318) is a delicate problem, because it should address the following requirements: should avoid using devices that can't build encrypted connections (there is no point in having an active channel that can't build a encrypted connection); should give a user preferred device a better chance (for example Ethernet devices can be desired over cellular ones); should minimize downtime due to switching of active device; should keep track of device reliability and should indicate which device has the best chance (lowest cost) of building/maintaining a working encrypted connection.

The cost for any given channel 306 or 308 can be calculated based on various factors indicating the current state and the historical performance of the corresponding communications port 16 or 18, as shown in FIG. 5. Optionally, step 316 of calculating cost may result in step 322 of rebooting the router 10. Step 322 will happen in case all channels 306, 308 etc. have requested reboot due to excessive cost for building an encrypted connection.

Figure 5A:
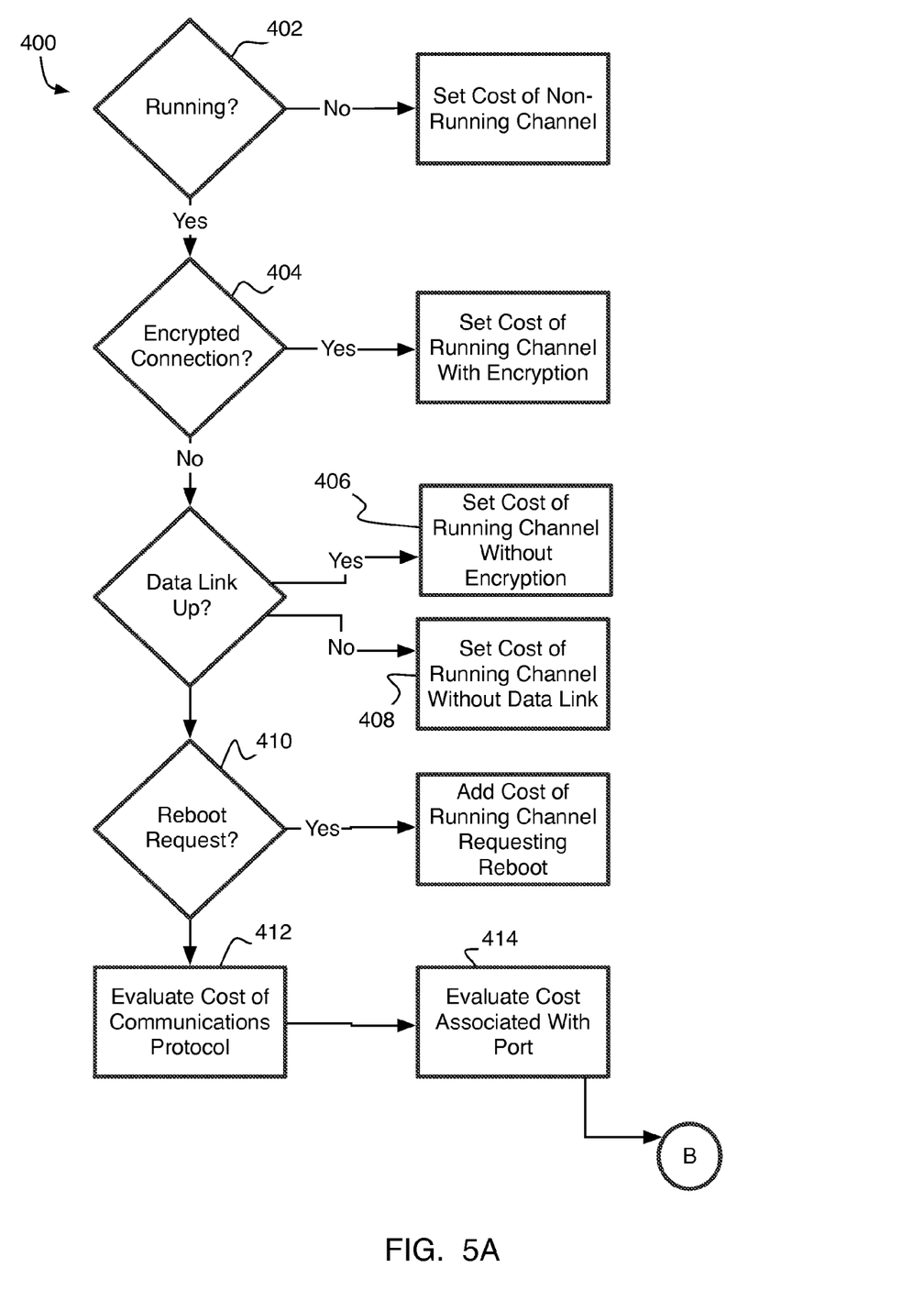
Figure 5B:
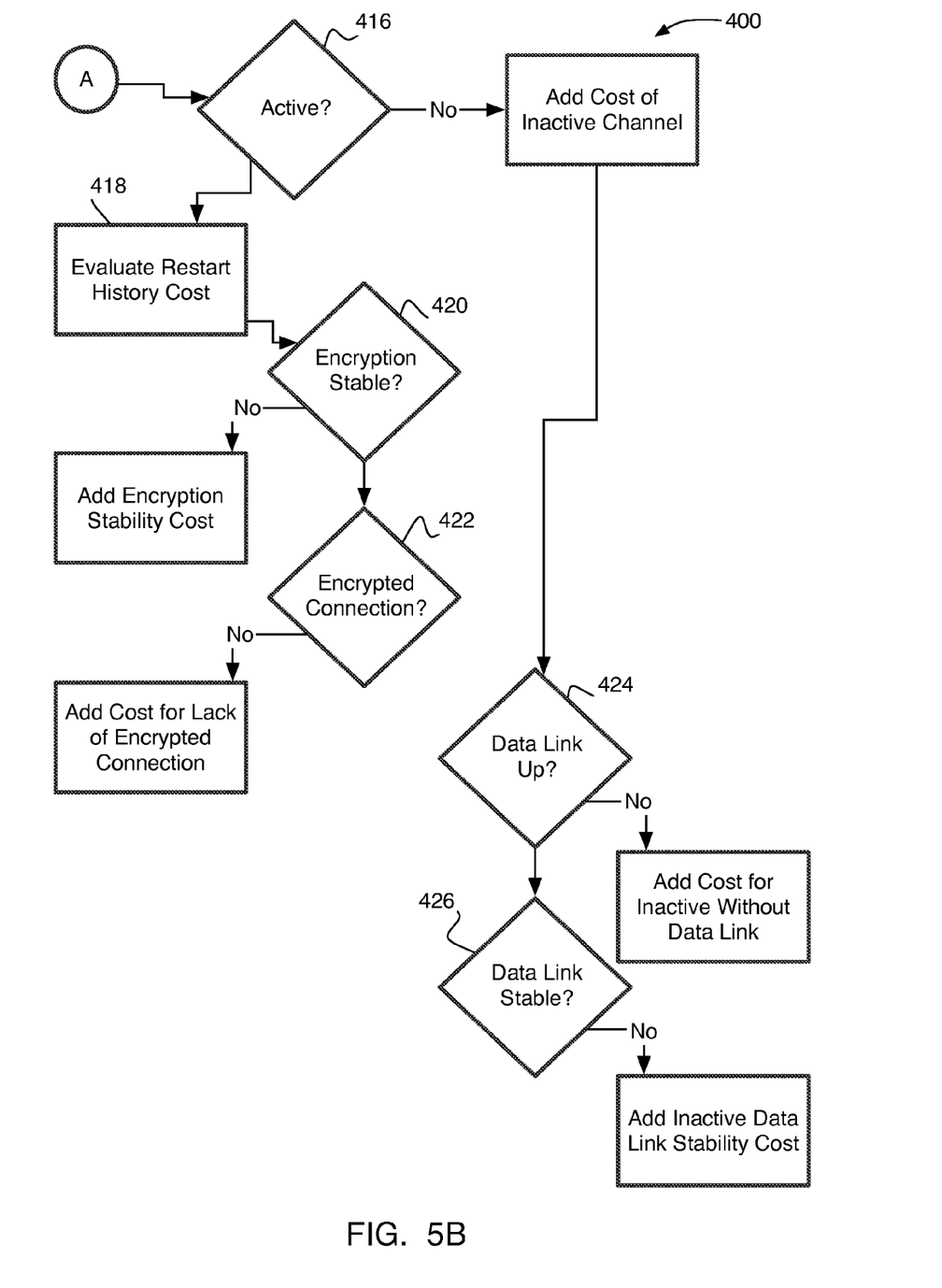

Referring now to FIG. 5, comprising FIGS. 5A-5B, the algorithm 400 is provided for accomplishing step 316 of calculating cost for one of the channels 306, 308. At steps 402-410, the algorithm 400 selects which to include of various "status costs" related to the expected difficulty of establishing a encrypted connection via the given channel. The status costs are based on a current status of the channel. At steps 412-414, the algorithm 400 calculates "parameter costs" that are related to configurable parameters of the given channel. These configurable parameters can affect how easily the given channel can achieve a particular status. At steps 416-426, the algorithm 400 calculates "historical costs" that are related to the router history 313.

For example, at step 402, the algorithm 400 determines whether to include the cost assigned to a non-running channel (e.g., one corresponding to an inoperative communications port). The cost assigned to a non-running channel should be a relatively large number to reflect the delay and uncertainty associated with device startup.

At step 404, the algorithm 400 determines whether to include the cost assigned to a channel currently carrying a working encrypted connection (e.g., VPN protocol, but could be any secured protocol). The cost assigned to a channel currently carrying a working encrypted connection should be minimal but should indicate the relative instantaneous likelihood of dropping the working tunnel. Thus, in general, the cost assigned to a channel currently carrying a working encrypted connection will be somewhat higher for a cellular connection than for a wired connection. If the cost assigned to a channel currently carrying a working encrypted connection is included, then the cost assigned to a non-running channel is left out.

At step 406, the algorithm 400 determines whether to include the cost assigned to a channel with a working communications channel connection (data link), but without a encrypted connection, e.g., a PPP connection for cellular device, or a working TCP/IP connection for wired device. The cost assigned for a channel without encrypted connection is larger than the cost for a working. If the cost for a channel without encrypted connection is included, then the costs for a non-working channel or for a channel with an encrypted connection are not included.

At step 408, the algorithm 400 determines whether to include the cost assigned to a channel that is running but is not connected on a communications channel (no PPP, or no IP). The cost for a running but not connected channel of course is larger than the cost for a connected channel without encrypted connection. If the cost for a running but not connected channel is included, the other status costs are not.

Then, at step 410, the algorithm 400 determines whether to include the cost assigned to a channel currently requesting the router to be rebooted. A channel can request a router reboot whenever the channel cannot accomplish its next required step, and cannot diagnose a problem preventing accomplishment. Thus, a channel that is established but cannot build a communications channel, can request a reboot; similarly, a channel that has a working communications channel, but cannot build a encrypted connection can request a reboot. The cost for a reboot request is assessed only for channels that are stuck on the encrypted connection phase, because channels that have not established a communications channel are covered by the larger value of a non-working channel. Thus, if the cost of a non-working channel has been included, the cost for a reboot request is skipped.

Thus, the algorithm 400 selects one of the above status costs for each channel 306 or 308.

FIG. 5 also shows selection or identification of parameter costs that may be defined for particular communication protocols or devices used by a given channel. For example, at step 412 the algorithm 400 selects a cost corresponding to a communications protocol, e.g., corresponding to one of "gen" (the DLPROTO or communications channel frame protocol used by digital circuits connections); "qmi" (the DLPROTO used for LTE cellular broadband); "ppp" (the protocol used for 3G cellular broadband); or "eth" (the Ethernet protocol); or other proprietary protocols.

At step 414 the algorithm 400 looks up a cost based on the design and expected performance of a particular communications port, taking into consideration, for example, the manufacturer or vintage of the port.

Further, FIG. 5 shows steps 416-426 of adding to each channel historical costs based on its past performance as recorded in the router history 313.

For example, at step 416 the algorithm 400 determines whether to add the cost of an inactive channel (one not currently carrying data; the idea is to favor the currently active channel, so as to avoid rapid switching between two otherwise identically qualified channels). At step 418 the algorithm 400 determines whether to add a cost for each restart event; a channel may restart itself when it cannot establish a communications channel. No more than a predetermined number of restarts are included in the restart cost. The restart count is cleared when the channel reaches its desired connection state.

At step 420, the algorithm 400 determines whether to include a cost for a channel that has not been able to maintain an encrypted connection for at least a predetermined time, at least a predetermined number of times. Stability is a binary measure, so a channel is marked as stable as soon as it maintains encrypted connectivity for more than the predetermined time. A connection for which there are not enough data to mark it as either stable or unstable is marked as unknown. The same concept of stability applies for the state when a channel is inactive, but it has built and tested a communications channel layer connection.

At step 422, the algorithm 400 determines whether to add a cost for any channel (active, or inactive) that does not have an encrypted connection. This cost typically will be added to all but the current active channel, as encrypted connections are not typically maintained across inactive channels.

At step 424, the algorithm 400 determines whether to add a cost for an inactive channel that does not have a communications channel established, while at step 426, the algorithm determines whether to add a cost for an inactive channel that has not been able to reliably maintain a communications channel connection (same standards of reliability as for an encrypted connection, discussed above). The encrypted connection costs are added to the total cost of both active and inactive units, but the communications channel costs are added only to the inactive units. This is done because the main goal is a stable encrypted connection, more than just a stable communications channel. Still, a bad communications connection suggests a bad future encrypted connection, so the algorithm 400 increases the cost for an inactive device that shows these symptoms. For devices that already are active (any communications channel issues clearly have been resolved), the algorithm 400 considers whether to establish an encrypted connection, without looking at communications connection history.

Other costs may include measures of latency or of signal quality or data throughput.

Referring to FIG. 3, the channel 306 corresponding to the Ethernet communications port 16 is assigned a first cost based at least on its current link status, encrypted connection status, device, and communications protocol. Meanwhile, the channel 308 corresponding to the cellular broadband communications port 18 is assigned a second cost based at least on its current link status, encrypted connection status, device, and communications protocol.

The device cost is indicative of design specified reliability and of empirical expectations of performance in establishing/maintaining the encrypted connection 318. The lesser value of total cost is associated with ethp0.

Accordingly, at step 320 the router control protocol algorithm 302 will switch the active channel to ethp0 and establish an encrypted connection 318 on channel 306 using communications port 16. The encrypted connection 318 connects from the processor 12 through the data link 307 to the intermediate host 205. From the intermediate host 205, the encrypted connection 318 extends to a remote host server 202, which uses the encrypted connection 318 to monitor and command the processor 12. In certain embodiments, the router control protocol 302 provides for buffering of the encrypted connection 318 during steps 312, 316, and 320, such that sporadic switching of the the encrypted connection across channels will not cause loss of data. The buffering typically is accomplished external to the processor 12, within conventional RAM.

Additional second communications ports 18, 20 and secondary channels 308 might be present. For example, additional second communications ports might include any of: an inactive router channel for dev mc1, with a working PPP connection; an active router channel for dev mc2, with a working encrypted connection; an inactive router channel for dev ethp0, with a working IP level connection; an inactive router channel for dev ethp1, not connected on DL, restarted for 5 times; and an inactive router channel for dev ethp2, not connected on DL, requesting reboot. Each of these varied channels will have its associated cost reflecting the various conditions described.

Out of the channels described above, the smallest value cost is associated with ethp0, so router control protocol still will establish the active channel and build encrypted connection (e.g., VPN tunnel) 318 on ethp0.

However, it is not desirable to be always stuck on the same channel. For example, it may happen that a typically more desirable channel goes offline due to a problem that cannot be corrected by resetting the channel, and therefore incurs a cost for a reboot request, which then locks the more desirable channel out of taking over encrypted communication.

Consider the following situation: a router having a cellular connection (mc1) and a wired connection (ethp1). The cellular connection mc1 has a small data plan with big penalties for overages. The speed is relatively low. By contrast, ethp1 is fast and cheap. But the internet provider for ethp1 had a problem, ethp1 was down for a period of time, and mc1 became the active device. Presuming the default device costs are higher for mc1 than for ethp1, when the ethp1 comes back and builds a working IP connection, the router control protocol 302 will see a lower cost for mc1 than for ethp1, due to ethp1 history of being down. Thus, the less preferred channel mc1 will remain the active channel.

The reboot request cost on ethp1 can be cleared only if ethp1 channel builds a working encrypted connection. This is to prevent looping on a "stuck" channel in case the router 10 resets. However, the channel ethp1 can not build an encrypted connection until it is the active channel. Therefore, the reboot request will not clear, and router control protocol will never activate ethp1. To get over this situation, there is a mechanism called "retry for better". When the difference in the device cost between the currently active channel and another channel is higher than a specified threshold value, the router control protocol will sporadically establish a "retry for better" condition in which it ignores selected costs related to device status history. Additionally, when recalculating costs during "retry for better", the router control protocol 302 will temporarily add a penalty cost to all channels with the device cost exceeding or equal to the device cost of the currently active device. Thus, in the exemplary case with mc1 and ethp1, the temporarily adjusted cost for mc1 will be higher than the cost for ethp1. Now router control protocol 302 will make ethp1 the active device. If ethp1 then will be able to build a tunnel, it will clear the reboot request, and its normal cost will be reduced to less than the cost of mc1. This will lock in ethp1 as once again being the preferred channel/device.

A potential down side of the retry for better mechanism is taking the existing (non-preferred) encrypted connection down and switching the active connection just in hope of establishing a preferred connection. But if the preferred connection is not able to build a working encrypted connection, the working connection will be lost for no benefit. Thus, in some embodiments, it is desirable to continue running the active encrypted connection while attempting to build a second encrypted connection on the new channel. With suitable data buffering, this approach should be transparent between the user LAN 201 and the host network 202. In other embodiments, some dropped data is acceptable. For example, an acceptable delay in re-establishing the preferred connection can be a user-adjustable parameter.

FIGS. 3 and 4 show one (simplex) embodiment of the invention, in which an encrypted connection is established on only a single active channel. According to a second (multiplex) mode of operation 500, shown in FIG. 6, the router control protocol does not select only a single active channel. Instead, channels 306 and 308 are simultaneously active with one or more distinct encrypted connections 318, 319, etc., and the router control protocol 302 performs step 501 of routing traffic to each channel. For example, traffic may be routed according to the protocol that is used for the traffic (e.g., RTP, UDP, TCP, etc.). Under this mode, a first category of data 502 is transmitted and received via channel 306, while a second category of data 504 is transmitted and received via channel 308.

Figure 6:
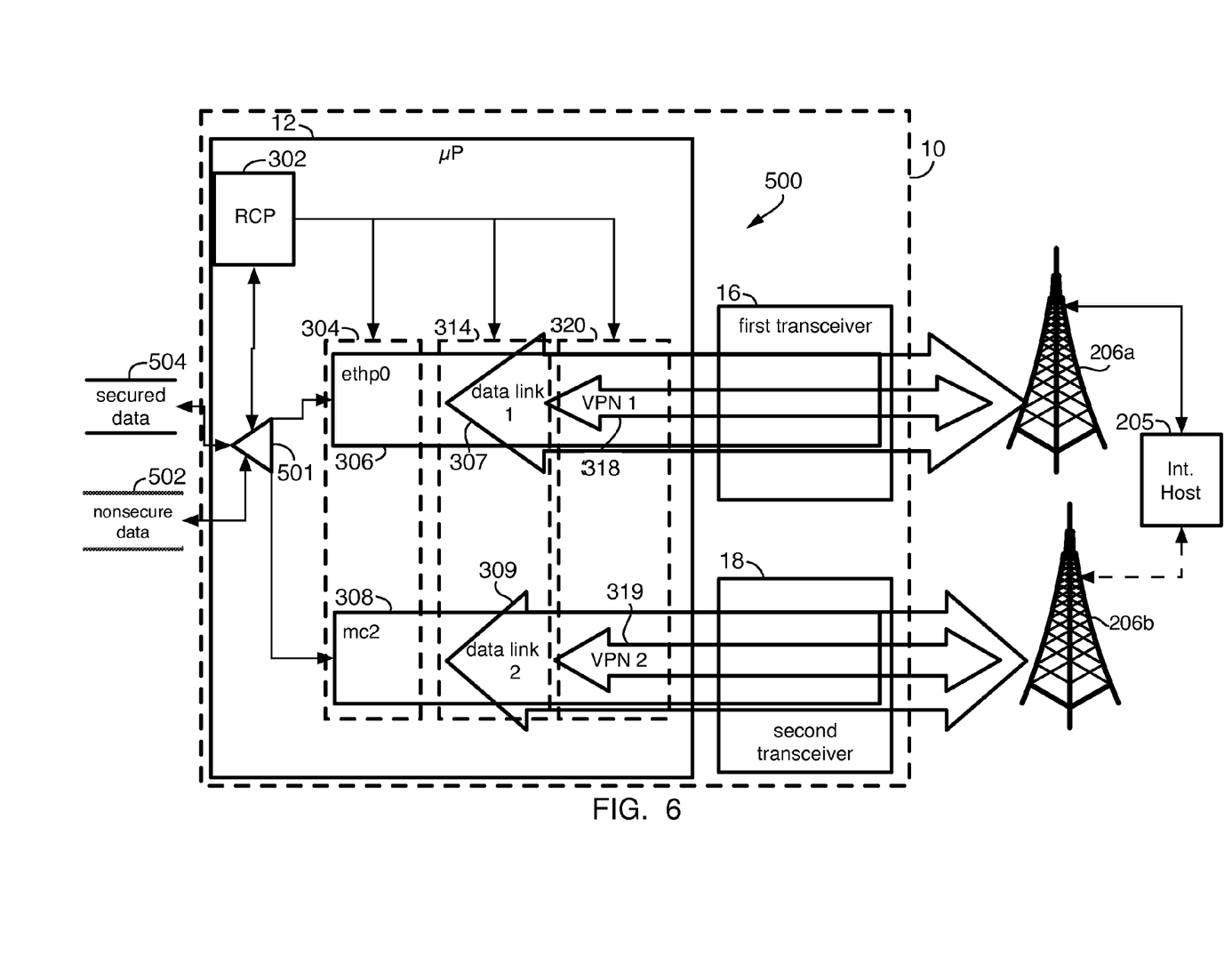
FIG. 6 shows in schematic view a second (multiplex) mode of operation of the router shown in FIG. 1

For example, the first category of data 502 may include customer internet access at a Café or the like, while the second category of data 504 may include customer purchase financial data such as credit card numbers or the like. The first category of data 502 may also include system tracking information such as board temperature, signal to noise ratio, number of reboots, network latency, number of PPP or IP resets, and results of component self checks. Some categories of data may not require encrypted handling and may be transferred simply via a data link 307 or 309. For example, data requiring encryption will be preferentially switched to a channel with the lowest cost for encryption, while data not requiring encryption will be preferentially switched to a channel having an active data link but no encrypted connection. Either or both categories of data 502, 504 may be buffered at the intermediate host 205. This mode of operation implies software at the intermediate host 205 for further routing of the multiplex data streams, both outbound from the LAN 200 to the host system(s) 204, and inbound from the host systems to the LAN. Thus, the router control protocol 302 reports to the intermediate host 205 what type of outbound data is carried via each channel 306 or 308, so that the intermediate host 205 may route inbound data back to the same channel.

In select embodiments of multiplex operation, the router control protocol will choose which traffic to go through each encrypted connection or communications channel, based on a cost per traffic type that will differ according to device.

In some aspects, system data may be used in a keep alive mode to hold open a cellular broadband connection that otherwise would close for lack of traffic.

Figure 7:
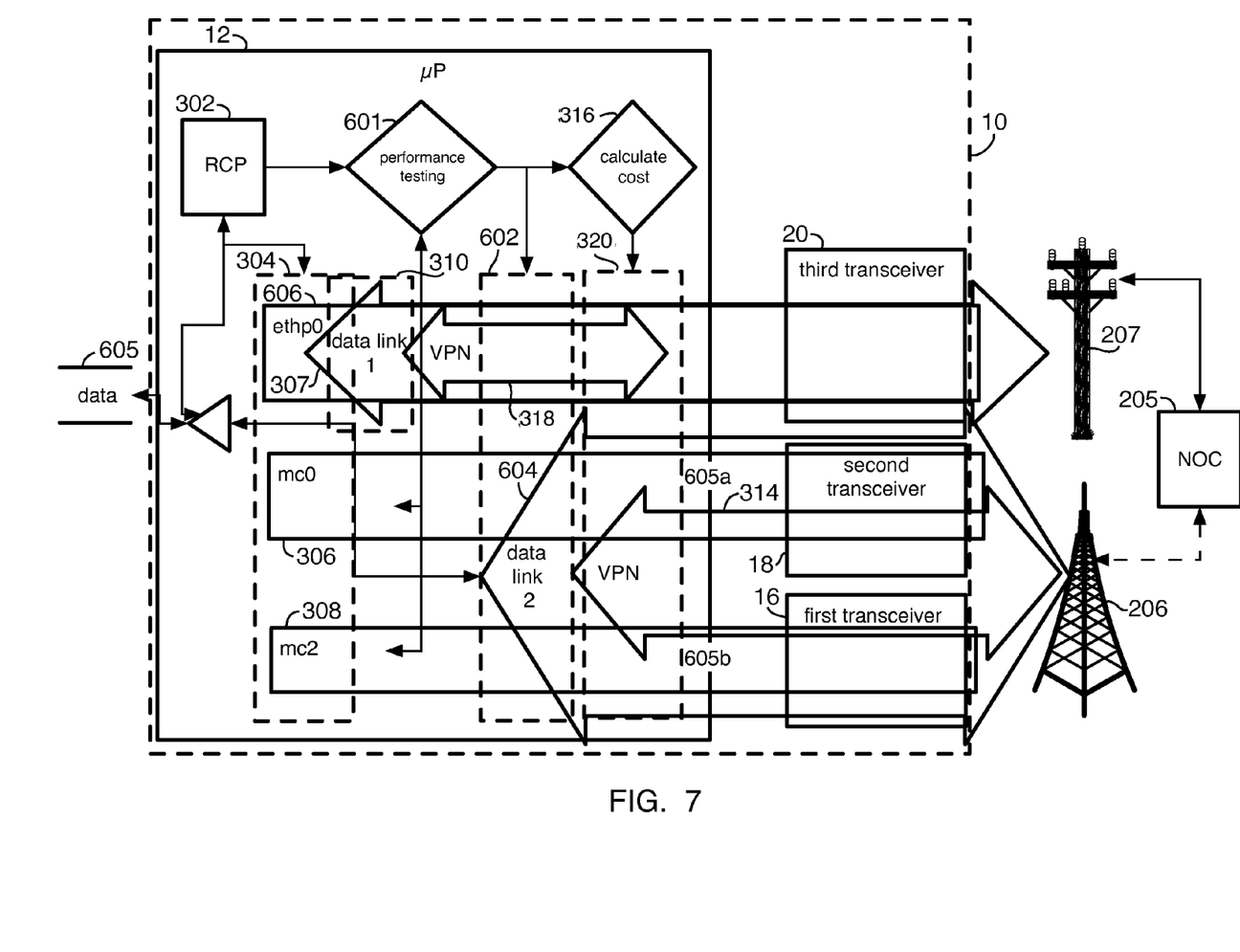
FIG. 7 shows in a first schematic view a third (bonded channel) mode of operation of the router shown in FIG. 1
Figure 8:
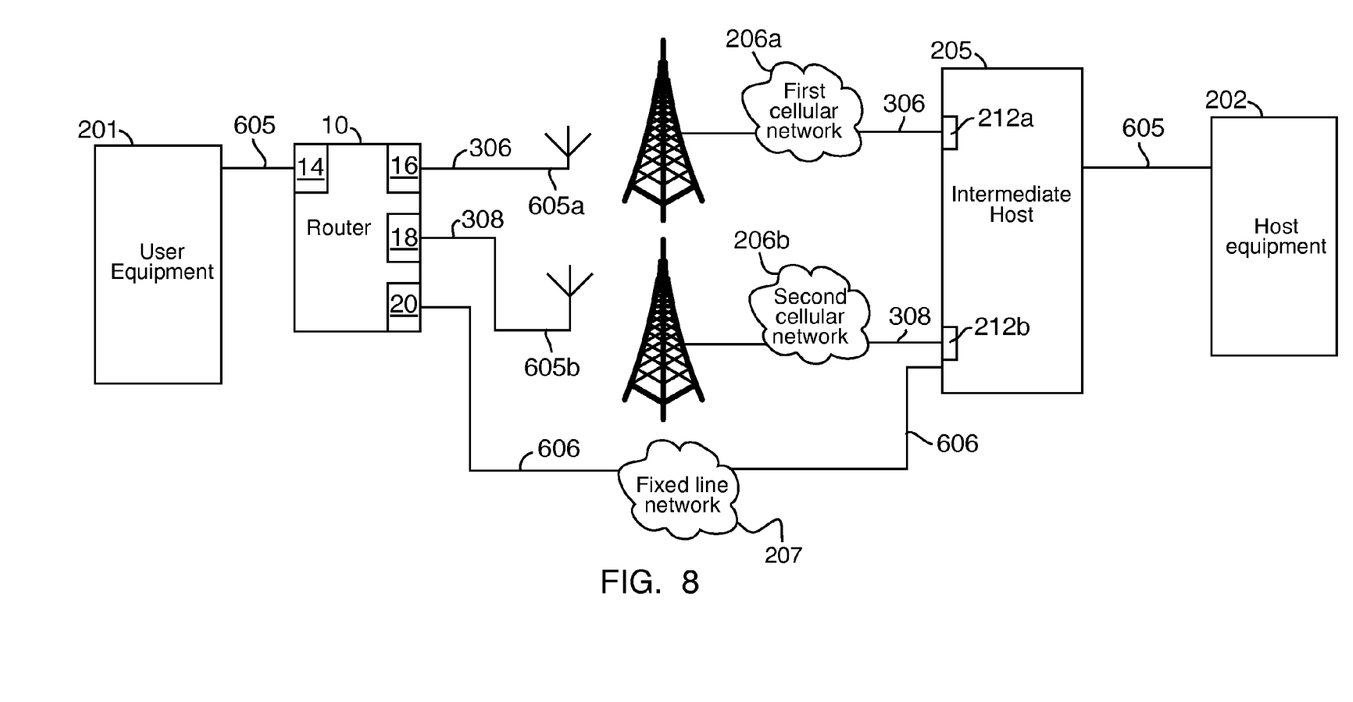
FIG. 8 shows in a second schematic view the bonded channel mode of operation as shown in FIG. 7.

In a third (bonded channel) mode of operation 600, as shown in FIGS. 7 and 8, the router control protocol 302 performs step 601 of performance testing each available router channel 306, 308, etc. to identify channels suitable for bonding. For example, suitable channels may meet threshold parameters including latency less than a predetermined number of milliseconds, throughput greater than a predetermined number of Mb/s, and fewer than one dropped packet per group of packets. Alternatively, suitable channels may be selected by performing step 316, and selecting channels that have total cost less than a threshold value. In certain embodiments, the router control protocol 302 permits user configuration of the threshold parameters or cost defining a suitable channel. In some embodiments, the router control protocol 302 sporadically repeats step 601 or 316, whereby changes in network performance can be identified and compensated. Thus, the router control protocol tracks performance of both suitable and unsuitable channels, for example in a database. In case no channels are suitable, then in some embodiments, the router control protocol 302 identifies the least unsuitable channels and defines new threshold parameters to render those channels suitable.

Having identified suitable channels, the router control protocol 302 then performs step 602 of building or rebuilding a multi-channel or bonded channel communications channel 604. "Building" means initiating the communications channel 604, while "rebuilding" means adding and/or removing channels supporting the communications channel. Rebuilding 602 is accomplished after each repetition of step 601 (identifying suitable channels), so that—in case network parameters have changed—the communications channel 604 can be re-configured to use advantageous data transfer connections and protocols. In certain embodiments, the router control protocol 302 can buffer data while accomplishing step 602 with the communications channel 604 active, so that data transfer can continue regardless which channels, channels, or physical connections support the communications channel. Thus, the router control protocol 302 will keep track of the performance of the channels or channels left out of the bonded channel, and will rebuild the bonded channel to include any channel whose performance improves sufficiently to render that channel suitable for bonding.

Among other advantages, the channel bonding mode of operation 600 may improve security, increase end to end system bandwidth capacity, enhance reliability of communications when wireless or network conditions are sub-optimal, and/or optimize rate plan cost value. Under the channel bonding mode of operation 600, packet traffic originating at either the host system 202 or the user equipment 201 can be carried completely by a single connectivity pathway (e.g., a backup channel 606), or can be divided among two or more pathways (e.g., the bonded channels 306, 308, etc.). Once divided, the packet traffic can be applied to multiple channels within a single carrier's domain (e.g., wireless network 206a) or multiple channels distributed among multiple carrier network domains (e.g., wireless networks 206a, 206b). Packets delivered by disparate pathways either arrive at endpoint (edge) equipment location(s) (e.g., host system 202, router 10) or they arrive at an intermediate host location(s) 205, etc., where the packets are re-associated and formatted for propagation over the target network infrastructure or destination nodes.

The bonded channel communications channel 604 spans at least two suitable channels 306 and 308 in such a way that data 605 can be continuously transmitted so long as either of the channels can carry the link. In case three or more channels are available, one known low cost channel is established as a "backup" channel 606, with a working encrypted connection 314 and routing configured to use this connection for client traffic. Meanwhile, the router control protocol 302 performs step 601 on the remaining channels and selects suitable channels to be used for building a bonded channel 604 (without the encrypted connection). After the bonded channel 604 is built, then router control protocol undertakes step 316 (calculating costs) between the "backup" channel and the bonded channel. For example, cost of the bonded channel can be calculated on a failover basis, starting from the highest cost and sequentially adding diminishing costs multiplied by the likelihood that higher cost channels will fail. Based on the cost calculation, at step 320 the router control protocol 302 switches the active encrypted connection to one of the backup or the bonded channel, and the inactive channel then becomes the new "backup."

In case at step 601 the bonded channel performance is bad (high packet loss, poor latency, small throughput), then router control protocol 302 can be configured to remove and add channels from the bonded channel 604 and retest the performance, until finding an optimum combination. Each channel will be assigned a static priority and a dynamic priority. Both priorities will be used to determine the order of dropping the channels from the bonded channel. The static priority will be assigned at configuration time, and the dynamic priority will be calculated at each repetition of step 601, based on the previous performance of the channel within the bonded channel.

Occasionally, so many channels will be dropped from the bonded channel 604, that the bonded channel becomes a "simplex" single channel (e.g., just one of the channels 306, 308, or 606). In this case, data transfer continues as in FIG. 3, while the router control protocol 302 will sporadically continue to perform step 601 and step 602, based either on a scheduled periodicity, a random periodicity, or on any observed change on any channel (in terms of latency, packet loss). At least a maximum retry interval will be set for attempting to rebuild a bonded channel.

Referring more specifically to FIG. 8, the bonded channel 604 can be implemented such that data 605 is split between a first substream 605a and a second substream 605b. The two substreams then are processed through distinct channels 306, 308 which send the data streams 605a, 605b respectively to first and second cellular networks 206a, 206b. Via these first and second distinct cellular networks 206a, 206b, the data streams 605a, 605b then arrive at distinct network servers 212a, 212b within the intermediate host 205. Software of the intermediate host then recombines the data streams 605a, 605b to reproduce the original data 605. Thus, to intercept the data 605 between the router 10 and the intermediate host 205 would require simultaneous interception of traffic on both of the cellular networks 206a, 206b.

In a further variation on the concept illustrated by FIG. 8, the separate data streams 605a, 605b may be directed to geographically distinct intermediate hosts (not shown), thence to the host system 202. In this variation, the host system 202 may be configured with special software that enables recombination of the data streams 605a, 605b to reconstruct the original data 605 at the host system 202. Thus, the data 605 essentially cannot be intercepted between the router 10 and the host system 202.

Although the invention has been shown and described with respect to the detailed embodiments thereof, it will be understood by those skilled in the art that various changes in form and detail thereof may be made without departing from the spirit and the scope of the invention. For example, although in exemplary embodiments a single processor 12 is described as implementing all aspects of the invention, in fact, aspects of the invention may equally well be accomplished in a distributed processor configuration.

What is claimed:
1. A router comprising:
a first communications port;
a second communications port; and
a processor;
wherein the processor is configured to monitor performance variables for the first communications port and the second communications port, and to log the monitored performance variables in a router history, the monitored performance variables indicating a historical performance of the first communications port and the second communications port;
wherein the processor calculates a cost of establishing or maintaining a secure connection with an intermediate host via each of the first and second communications ports; establishes or maintains a secure connection via the lower-cost communications port; and directs transmission of data via the secure connection;

wherein calculating the cost includes evaluating the historical performance of the first communications port and the second communications port and determining how much time it takes to establish the secure connection, how long the secure connection will stay open, and how much data throughput can be achieved during the time that the secure connection is open;

wherein the lower-cost communications port is the communications port through which a lesser time is required to establish the secure connection, results in a longer time that the secure connection will stay open, or has a greater amount of data throughput that can be achieved during the time that the secure connection is open.

2. A router as claimed in claim 1, wherein the processor maintains active communications channels via both of the first and second communications ports.

3. A router as claimed in claim 1, wherein at least one of the first and second communications ports is a cellular transceiver.

4. A router as claimed in claim 3, wherein both of the first and second communications ports are cellular transceivers, and each of the first and second cellular transceivers is operable on a different network.

5. A router as claimed in claim 4, wherein the cost of each cellular transceiver depends at least in part on the network it uses.

6. A router as claimed in claim 1, wherein the processor establishes a communications channel with the intermediate host via each communications port and establishes a secure connection with the intermediate host via at least one of the communications channels.

7. A router as claimed in claim 6, wherein the processor establishes an encrypted connection on each of the communications channels.

8. A router as claimed in claim 1, wherein the processor establishes a single communications channel with the intermediate host across all of the two or more communications ports.

9. A router as claimed in claim 8, wherein the processor establishes an encrypted connection on the single communications channel.

10. A router as claimed in claim 8, wherein the processor receives a single stream of data and splits the stream of data into at least two substreams, each substream going to a different one of the two or more communications ports.

11. A router as claimed in claim 1, wherein the processor establishes across each of the two or more communications ports a communications channel with a corresponding one of a plurality of intermediate hosts, thus establishing a plurality of communications channels with the plurality of intermediate hosts;

wherein the processor receives a single stream of data and splits the stream of data into plural substreams of data, each substream going to a different communications channel.

12. A router as claimed in claim 11, the plurality of intermediate hosts being geographically diverse.

13. A router comprising:
a first cellular transceiver;
a second cellular transceiver; and
a processor;
wherein the processor is configured to monitor performance variables for the first cellular transceiver and the second cellular transceiver, and to log the monitored performance variables in a router history, the monitored performance variables indicating a historical performance of the first cellular transceiver and the second cellular transceiver;

wherein the processor calculates a cost of establishing or maintaining communication with an intermediate host via each of the first and second cellular transceivers; and establishes or maintains communication with the intermediate host via at least the lower-cost cellular transceiver;

wherein calculating the cost includes evaluating the historical performance of the first cellular transceiver and the second cellular transceiver and determining how much time it takes to establish communication, how long communication will stay open, and how much data throughput can be achieved during the time that communication is open.

14. A router as claimed in claim 13, wherein each of the first and second cellular transceivers operates on a different network.

15. A router as claimed in claim 14, wherein the cost of each cellular transceiver depends at least in part on the network it uses.

16. A router as claimed in claim 13, wherein the processor receives a single stream of data and splits the stream of data into at least two substreams, each substream going to a different one of the two or more cellular transceivers.

17. A method for routing data via one or more of multiple communications channels, comprising:
establishing at least first and second communications channels via first and second communications ports;
monitoring performance variables for the first and second communications channels;
logging the monitored performance variables for the first and second communications channels in a database, the monitored performance variables indicating a historical performance of the first and the second communications channels;
calculating a cost for establishing or maintaining a data connection on each of the first and second communications channels, including evaluating the historical performance of the first and second communications channels and determining how much time it takes to establish the data connection, how long the data connection will stay open, and how much data throughput can be achieved during the time that the data connection is open; and
establishing or maintaining the data connection on the lower-cost communications channel.

18. A method as claimed in claim 17, wherein the cost is calculated based in part on a communications protocol used by the communications channel.

19. A method as claimed in claim 17, wherein the cost is calculated based in part on a status of the communications channel.

20. A method as claimed in claim 17, wherein the cost is calculated based in part on likelihood of maintaining the communications channel.

21. A method as claimed in claim 17, wherein the cost is calculated based in part on the type of communications port associated with the communications channel.

22. A method as claimed in claim 17, wherein the data connection to be established is an encrypted connection, and the cost is calculated based in part on a category of data to be transferred via the encrypted connection.

23. A method as claimed in claim 17, further comprising monitoring performance of the data connection, and switching communications channels in response to poor performance.

* * * * *